2,821,065

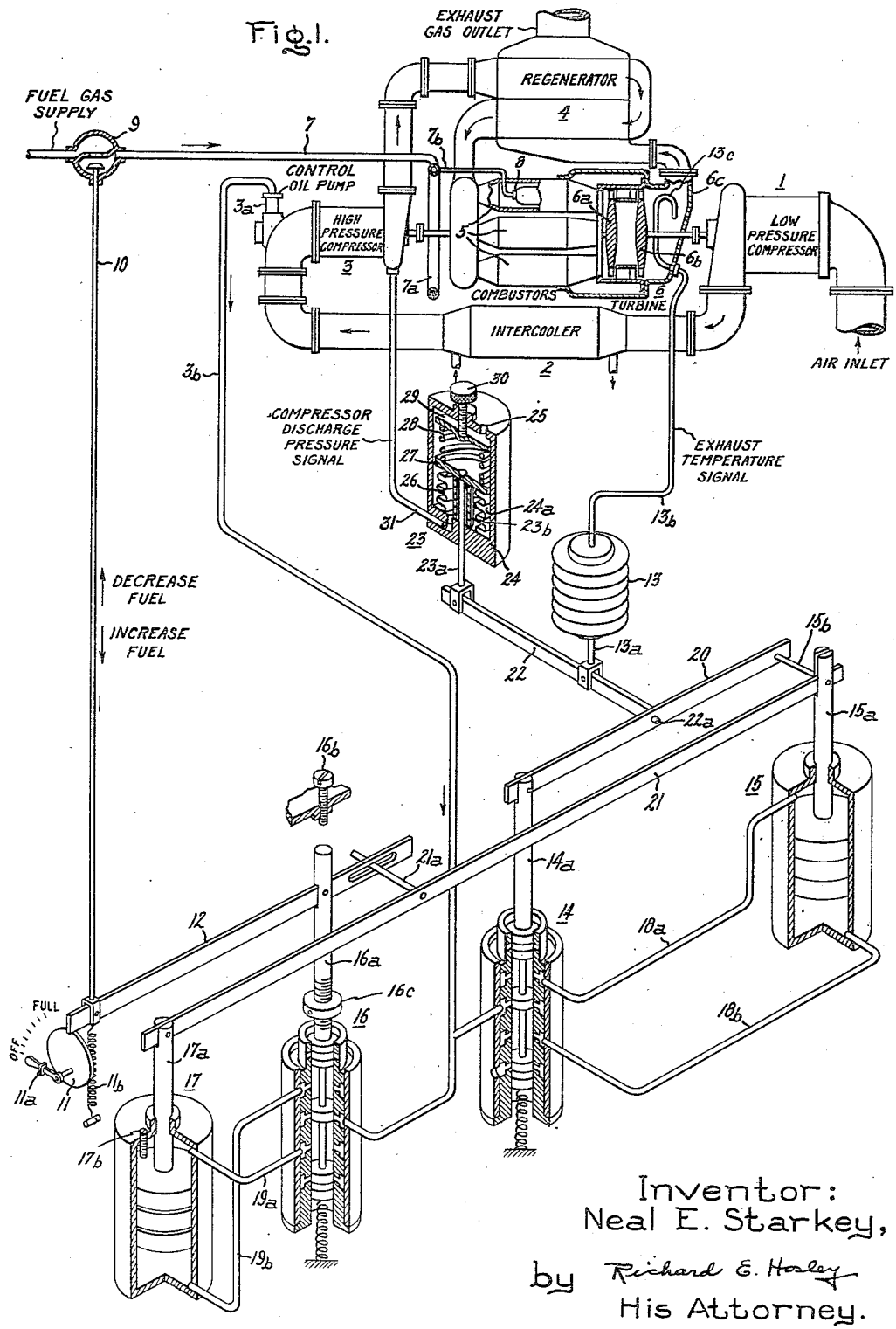

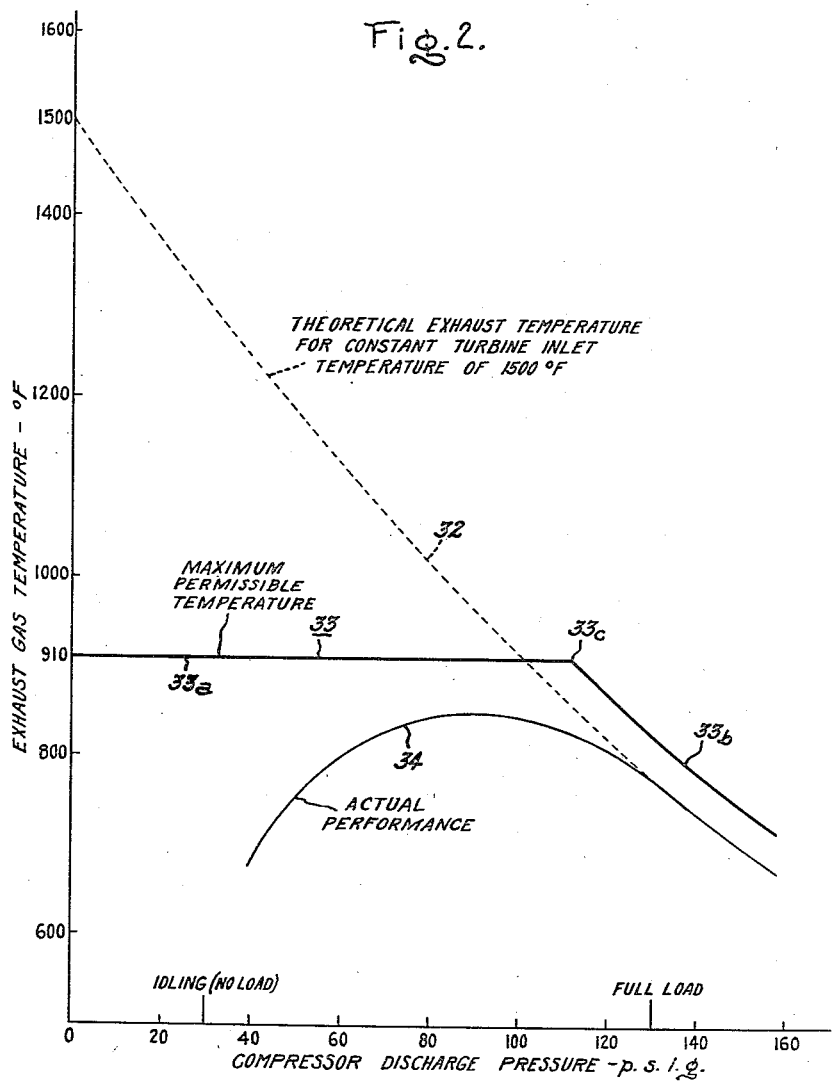

EXHAUST TEMPERATURE REGULATOR FOR GAS TURBINE POWER-PLANT

Neal E. Starkey, Schenectady, N. Y., assignor to General Electric Company, a corporation of New York Application July 5, 1952, Serial No. 297,272

2 Claims. (Cl. 60—39.28)

This invention relates to hydraulic-mechanical fuel regulating systems, particularly to an improved regulator for limiting the temperature levels in a thermal power-plant such as a gas turbine.

The invention comprises a still further improvement in the temperature regulating mechanism of my Patent 2,528,252, issued October 31, 1950 and assigned to the same assignee as the present application.

In thermal power-plants such as gas turbines, operating at extremely high temperature levels, it has been found difficult to obtain temperature-responsive devices physically adequate to withstand for long periods of time the extreme temperatures encountered. Accordingly, it has been found desirable to measure the temperature of the spent motive fluid in the exhaust casing, which is substantially below the maximum temperatures in the plant, and then use that temperature as an indication of the general temperature level occurring in the power-plant. The temperature signal may conveniently be obtained by a temperature responsive "bulb" in the form of a long closed-end tube disposed through and across the exhaust passage so as to be responsive to an average value of the gas temperatures existing in various portions of the exhaust casing. In a large power-plant, this temperature sensitive bulb may be 6 feet or more in length, and it will ordinarily be charged with an expansible fluid such as argon gas. The pressure of this gas is communicated to a pressure-responsive bellows in the regulating system, which pressure is of course a measure of the average temperature existing in the exhaust casing.

Analysis shows that in a gas turbine powerplant, best overall efficiency is obtained if the inlet temperature to the turbine is maintained as high as feasible. As is well known in the art, the inherent characteristics of the gas turbine cycle make it desirable to operate the machine at the maximum permissible turbine inlet temperature for as large a percentage of the operating time as possible, since the overall thermal efficiency drops off seriously as the turbine inlet temperature decreases. It is of course necessary that the temperature control mechanism include means for establishing an absolute limit beyond which the temperature level in the power-plant may never go. Finally, it is found desirable that the maximum exhaust temperature limit shall be caused to decrease as the pressure ratio across the turbine increases, if excessive turbine inlet temperatures are to be effectively prevented.

Accordingly, the principal object of the present invention is to provide an improved gas turbine temperature limiting regulator of the type described for establishing an absolute maximum exhaust temperature limit which decreases as a function of increasing pressure ratio across the turbine, that is, as a function of increasing turbine load output.

Other objects and advantages will become apparent from the following description, taken in connection with the accompanying drawings, in which Fig. 1 is a diagrammatic representation of a gas turbine power-plant with a perspective layout, partly in section, of an exhaust temperature regulator incorporating the invention, and Fig. 2 is a graphical representation of certain operating characteristics of the power-plant.

Generally stated, the invention is practiced by providing a bellows device responsive to the highest pressure existing in the power plant and connected to modify the action of the exhaust temperature sensing mechanism to achieve the novel operating characteristics described herein.

Referring now more particularly to Fig. 1, the gas turbine power-plant is represented as comprising a low pressure compressor 1 connected in series with an intercooler 2, high pressure compressor 3, regenerator 4, and combustion system comprising a plurality of combustors 5, which furnish motive fluid to a two-stage turbine indicated generally at 6. This includes a first-stage bucket wheel 6a connected to drive the high pressure compressor 3, and a mechanically independent second-stage bucket wheel 6b connected to drive the low pressure compressor 1. Spent motive fluid is collected in the exhaust casing 6c and directed through the regenerator 4, in a manner which will be apparent from the drawing. Fuel for the combustion system is supplied through a conduit 7 to a manifold 7a having a plurality of branch conduits, only one of which is shown at 7b as connected to the fuel nozzle 8 in the uppermost combustor 5. While any suitable fuel, for instance Diesel oil or the heavy residual petroleum product known as "Bunker C," may be used, the present power-plant is shown as operating on natural fuel gas, the rate of supply of which is controlled by a main fuel regulating valve indicated generally at 9. The flow control member of valve 9 is connected to be positioned by an operating rod 10. As indicated by the legends on the drawing, downward motion of rod 10 increases the fuel supply and upward movement decreases the fuel rate.

The fuel control valve 9 is primarily positioned by an input cam 11 shown diagrammatically as being positioned by a manual lever 11a. Actually, the portion of the regulating system disclosed herein is only one small component of the complex hydraulic-mechanical-electrical system found necessary to integrate the many operating characteristics which must be correlated in order to effect proper control of a large gas turbine. If oil is used as a fuel, these regulating devices may take various forms, as represented in the United States patent to Starkey et al. 2,558,592 issued June 26, 1951 and assigned to the same assignee as the present application, as well as in Patent 2,622,393 of Edwards et al. issued December 23, 1952 and assigned to the same assignee. Such regulating systems have some kind of signal output member adapted to control the fuel supply; and, when the temperature limiting mechanism of my earlier Patent 2,528,252 is incorporated, the signal output cam member 11 acts on the fuel control member 10 through an intermediate lever 12 positioned by a plurality of hydraulic servo devices, as follows.

This maximum temperature limiting mechanism comprises broadly a temperature responsive bellows 13, a hydraulic amplifier for increasing the power and range of movement of the temperature sensing device, comprising a "temperature pilot" shown generally at 14 and a "temperature power piston" shown at 15. In order to control the rate of change of temperature, a "rate pilot" 16 is connected to control a "rate power piston" 17. The operation of these components 13, 14, 15, 16, 17 will be obvious from a consideration of my Patent 2,528,252, although it will be noted that certain components disclosed therein have not been shown here, for the sake of simplicity and clarity, since not essential to an understanding of the present invention.

Hydraulic liquid for actuating the regulating mechanism is furnished by a suitable control oil pump, indicated diagrammatically in the drawing at 3a as being driven by gears (not shown) from the high pressure compressor rotor. There will, of course, be some means (not shown) for maintaining essentially constant the supply pressure of this hydraulic control oil. This operating liquid is supplied by conduit 3b to the inlet ports of the temperature pilot 14 and rate pilot 16 respectively.

As will be apparent from Fig. 1, the temperature pilot 14 effects flow of operating liquid to and from the temperature piston 15 by way of conduits 18a, 18b, while the rate pilot 16 is connected to the rate piston 17 by conduits 19a, 19b. The mechanical interconnections include a primary lever 20 pivoted at one end to the spindle 14a of the temperature pilot and at the other end to the piston rod 15a of the temperature piston. A second lever 21 has end portions pivoted to the temperature piston rod 15a and rate piston rod 17a respectively, and an intermediate portion carrying a projecting member 21a which operatively engages the end of the output lever 12. Spindle 16a of the rate pilot is pivoted to an intermediate portion of the output lever 12. The uppermost position permitted for the rate pilot 16a is determined by an adjustable stop member shown as an adjusting screw 16b, while the lowermost position is determined by a stop member 16c.

The operation of this temperature and rate of change of temperature regulating mechanism as described above is as follows. In general, the rate piston 17, under the control of the rate pilot 16, serves to set up a "datum rate of movement," which is mechanically "compared" by the lever 21 with the rate of movement produced by the temperature responsive piston 15. The connecting member 21a effects movement of the output lever 12 only when the temperature or rate of change of temperature exceeds the values which the system is designed to maintain. The several methods of operation of this regulating mechanism are detailed completely in my Patent 2,528,252.

In accordance with the present invention, the output rod 13a of the temperature bellows 13 is not connected directly to the primary lever 20, as in my prior patent, but acts through a special input lever 22 which is connected to be positioned jointly by the temperature bellows 13 and a second pressure responsive bellows assembly shown generally at 23. The bellows 23 comprises a housing 24 defining a cylindrical chamber 24a vented to atmosphere by way of an opening 25 and containing a flexible bellows 26. The upper end of the bellows is sealed to an abutment disk 27 connected to the end of the output rod 23a and biased downwardly by a coil spring 28. For adjusting the compression of spring 28, the upper end thereof seats on a disk member 29, the position of which may be adjusted by a set screw 30. The lower end of bellows 26 is sealed to the housing, and the pressure to be sensed is communicated to the interior of the bellows by a conduit 31. As shown in Fig. 1, conduit 31 communicates with the high pressure discharge scroll of the compressor 3, which of course represents the highest pressure existing anywhere in the system. Actually, this pressure is taken as a measure of the turbine inlet pressure, which differs only slightly from the compressor discharge pressure by reason of the relatively small pressure drops occurring in the regenerator 4, combustion system 5, and the related piping.

The force of spring 28 can be adjusted so disk 27 is held against stop member 23b so that there will be no motion of the output rod 23a until the compressor pressure inside bellows 26 rises to a preselected value. Thereafter, increasing compressor discharge pressure will cause stem 23a to move upwardly. The result is that the input lever 22 is positioned jointly in accordance with the temperature signal pressure from the bulb 13c communicated by conduit 13b to the temperature bellows 13, which acts through the rod 13a on the input lever, as modified by the motion of the compressor pressure responsive rod 23a. The right end portion 22a of lever 22 is pivotally connected to the mid-portion of primary lever 20.

Attention is directed to the fact that, if the condition responsive devices 13, 23 are capable of producing sufficient power, then the end 22a of input lever 22 can be pivoted directly to the member 15b, so the right-hand end of lever 21 will be positioned directly by lever 22, without the aid of the hydraulic servo 14, 15.

The overall effect and method of operation of this improved temperature regulating apparatus is illustrated graphically in Fig. 2. Here, the ordinate represents the exhaust gas temperature to which the temperature responsive bellows 13 is sensitive, while the abscissa represents compressor discharge pressure as sensed by the bellows unit 23. The broken curve 32 is the theoretical turbine exhaust temperature required if the turbine inlet temperature were to be maintained exactly constant at 1500° F. It will be observed that this curve crosses the ordinate at 1500° and zero compressor pressure. The temperature drop below 1500°, as compressor pressure increases, is of course due to the energy removed from the motive fluid in order to drive the compressor and generate the useful power output. The heavy curve 33 represents the maximum permissible temperature and comprises the horizontal portion 33a and the sloping terminal portion 33b. It is to be observed that the portion 33b is parallel to the curve 32, with a differential of roughly 50° between.

The position of the horizontal limiting curve 33a is determined by the adjustment of the maximum temperature setting screw 17b and stop 16c in Fig. 1. The "knee" in the curve 33, identified 33c, represents the point at which the compressor discharge pressure begins to overcome the "preload" of spring 28 and effect movement of the pressure responsive rod 23a. The horizontal location of knee 33c on curve 33a is determined by adjustment of the set-screw 30 of the compressor discharge bellows, which of course varies the differential between curve 33b and curve 32.

It follows that the effect of the compressor pressure biasing arrangement is to cause the temperature limiting curve 33 to drop off beyond a certain preselected pressure and thereafter to follow the general shape of the "constant inlet temperature curve" 32 with a preselected differential therebetween. The actual performance curve of the power-plant will be substantially as represented by the smooth curve 34. It will be observed that this curve coincides with the theoretical "constant inlet temperature curve" 32 over a substantial range adjacent the "full load" end of the curve. In actual operation, the exhaust temperature may transiently rise above the value represented by curve 34, but the operation of the regulating mechanism will prevent it ever going above the absolute limiting curve 33. Thus it will be seen that the effect of the compressor pressure biasing arrangement incorporated in the invention is to more fully protect the power-plant against excessive temperature, since exhaust temperature is limited to a preselected constant rise above the normal operating curve.

To state the operation of my improved regulator in a somewhat different manner, it may be said that the effect of the compressor pressure biasing bellows 23 is to render the stop 16c effective sooner than would be the case if the invention were not employed. This is because increasing pressure in the bellows 26 produces an upward increment of movement of the left-hand end of lever 22, so that the right-hand end portion 22a moves downwardly, upon an increase in pressure in the bellows 13, by a greater amount than would be the case if the compressor discharge pressure were lower. Thus, increasing the compressor discharge pressure effects a recalibration of the temperature limiting function so that the limit is reached sooner as load increases, in the full load range of operation. The mechanical changes required to produce this new effect are extremely simple and readily adjusted to alter the differential between the maximum temperature limiting curve and the normal operating curve.

It will be apparent to those skilled in the art that many alterations and substitutions of mechanical and hydraulic equivalents may be employed in practicing the invention, and it is of course intended to cover by the appended claims all such modifications as fall within the true spirit and scope of the invention.

What I claim as new and desire to secure by Letters Patent of the United States is:

1. In a temperature regulating mechanism for a gas turbine power-plant having a compressor supplying air under pressure to a combustion system delivering motive fluid to a turbine, the combination of means for regulating the rate of fuel supply to the combustion system, and means for automatically modifying the supply of fuel in accordance with turbine exhaust temperature comprising a primary member connected to decrease the rate of fuel supply upon an increase in temperature, an input lever member having a first end portion connected to position said primary member, means responsive to turbine exhaust temperature for positioning an intermediate portion of said input lever in the decrease fuel direction upon an increase in turbine temperature, and means responsive to compressor discharge pressure and connected to position a spaced portion of said input lever to move the primary member by a further increment in the decrease fuel direction upon an increase in compressor discharge pressure, said pressure responsive means comprising a flexible bellows defining an expansible chamber to which compressor discharge pressure is communicated, spring means biasing said bellows in opposition to the compressor pressure therein, and means for adjusting the force of said spring for varying the point at which compressor discharge pressure begins to modify the rate of fuel supply.

2. In temperature regulating mechanism for a gas turbine power-plant having hot gas generating means supplying motive fluid under pressure to a turbine rotor, the combination of means controlling the rate of fuel consumption in the hot gas generating means as a function of load output desired from the turbine rotor, means responsive to turbine exhaust temperature and connected to move said fuel consumption control means in the decrease direction, means rendering said temperature responsive means effective only upon an increase in exhaust temperature above a preselected maximum temperature limit, means connected to modify the action of said temperature responsive means to reduce said preselected maximum temperature limit as a function of increasing turbine output, and means rendering said modifying means effective only in the full load range of operation.

References Cited in the file of this patent

UNITED STATES PATENTS

| | | |
|---|---|---|
| 2,095,991 | Lysholm | Oct. 19, 1937 |
| 2,516,909 | Redding | Aug. 1, 1950 |
| 2,528,252 | Starkey | Oct. 31, 1950 |
| 2,566,373 | Redding | Sept. 4, 1951 |
| 2,589,074 | Goodwin | Mar. 11, 1952 |

FOREIGN PATENTS

| | | |
|---|---|---|
| 416,463 | Great Britain | Sept. 14, 1934 |
| 595,357 | Great Britain | Dec. 3, 1947 |